Nov. 6, 1934.                H. D. GEYER                 1,979,969
                  PROPELLER SHAFT WITH RUBBER CUSHION
                         Filed Aug. 17, 1931
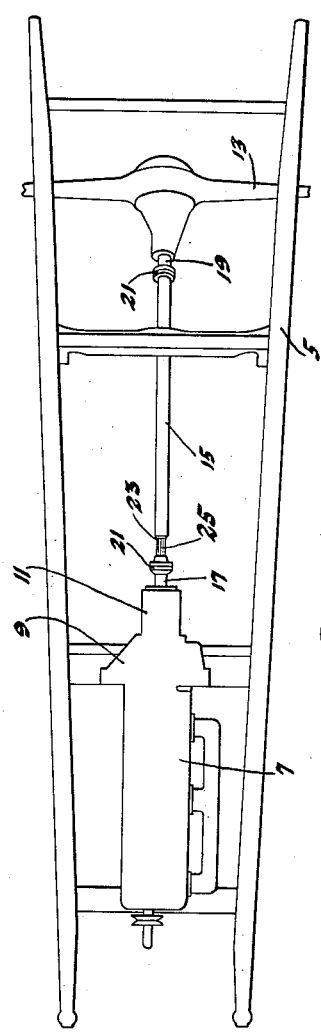
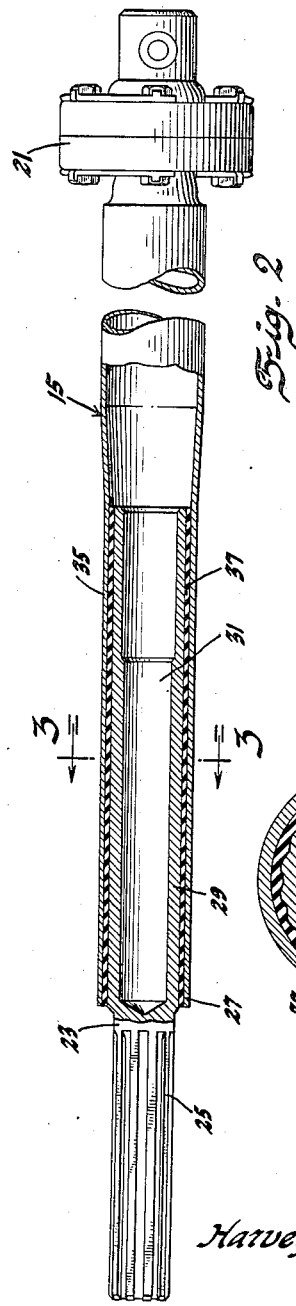
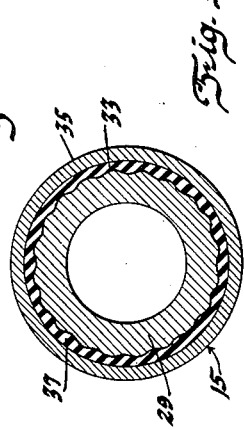
Inventor
Harvey D. Geyer
By Blackmore, Spencer & Keith
Attorneys Patented Nov. 6, 1934

1,979,969

UNITED STATES PATENT OFFICE 1,979,969

PROPELLER SHAFT WITH RUBBER CUSHION

Harvey D. Geyer, Dayton, Ohio, assignor to Inland Manufacturing Company, Dayton, Ohio, a corporation of Delaware Application August 17, 1931, Serial No. 557,554

1 Claim. (Cl. 64—29)

This invention relates to power transmitting mechanism and specifically to an improvement in a propeller shaft for use on vehicles.

It is an object of the invention to prevent, by the use of rubber associated with the propeller shaft, the transmission of torque vibrations from the engine to the rear axle.

Another object is to prevent rear axle noises, such as may result from faulty gear engagement, from being transmitted to the change speed transmission and the body through the propeller shaft.

Still another object is to smooth out the action of the clutch. By the use of rubber, any too sudden application of the clutch results in a shock which will be absorbed by the rubber instead of by the rear axle drive mechanism.

Another object to be attained is the avoidance of transmission rattle resulting from propeller shaft whip or other vibratory movements in the transmission line. With the use of rubber the whipping action is absorbed and the rattle avoided.

Other objects and advantages to be attained will be understood from the following description and the accompanying drawing.

In the drawing—

Fig. 1 is a plan view of a vehicle chassis having my invention embodied therein.

Fig. 2 is a longitudinal section through the novel propeller shaft.

Fig. 3 is a section on line 3—3 of Fig. 2.

Referring by reference characters to the drawing, numeral 5 represents the conventional chassis frame. Numeral 7 is the engine, 9 the clutch, and 11 the change speed unit. The rear axle is marked 13 and the propeller shaft, designated as a whole by numeral 15, connects the transmission shaft 17 emerging from the change speed unit with the pinion shaft 19, suitable universal joints being used as shown at 21.

The propeller shaft 15 consists of two parts, a forward part 23 which may be splined as at 25 to provide a sliding engagement with the forward universal joint 21 and the rear part 35. From the point 27 the shaft member 23 is enlarged in diameter as at 29, the enlarged part being bored out as at 31. The enlarged part 29 is preferably, although not necessarily, externally knurled as at 33 (see Fig. 3) and is received within the open end of the rear part 35. Seated about the enlarged part 29 and within the rear part 35 is a ring of rubber 37. After the outer part is assembled over the rubber ring covering the inner part it is swaged down to a smaller radial dimension. As a result of this process the rubber ring, originally comparatively short, is lengthened to the extent shown in Fig. 2. The high pressure given to the outer ring 35 causes the rubber to fit tightly against the outer periphery of part 29 and against the inner wall of part 35. The rubber is so firmly held that the driving torque is transmitted from one ring to the other.

As a result of this construction there is a complete avoidance of the transmission of torque vibration from the engine to the rear end since the vibrations are absorbed by the rubber ring. The noises which may be developed in the rear axle are also absorbed by the rubber and not transmitted through the change speed unit to the body. The action of the clutch is rendered smooth, sudden engagements of the clutch being absorbed by the rubber instead of being transmitted. Transmission noises resulting from propeller shaft whip or other causes are eliminated since such vibrations are absorbed by the rubber ring.

I claim:

For use in a motor vehicle having a power source and mechanism driven thereby, a propeller shaft adapted to transmit the power from said source to said mechanism, said propeller shaft comprising an inner shaft member, an outer tubular shaft member of substantially uniform diameter coaxially surrounding a substantial part of said inner shaft member and spaced therefrom a distance which is small relative to the shaft diameter a rubber ring under radial compression and axial elongation between said shaft members and adapted to deliver driving torque from one to the other of said shaft members, to absorb vibration, and to prevent noise.

HARVEY D. GEYER.